United States Patent
Li et al.

(10) Patent No.: US 11,756,444 B2
(45) Date of Patent: Sep. 12, 2023

(54) STUDENT MESSAGE MONITORING USING NATURAL LANGUAGE PROCESSING

(71) Applicants: Andrew Li, Reston, VA (US); Katelynn E Wang, Reston, VA (US)

(72) Inventors: Andrew Li, Reston, VA (US); Katelynn E Wang, Reston, VA (US)

(*) Notice: Subject to any disclaimer, the term of this patent is extended or adjusted under 35 U.S.C. 154(b) by 28 days.

(21) Appl. No.: 17/081,686

(22) Filed: Oct. 27, 2020

(65) Prior Publication Data

US 2022/0130267 A1 Apr. 28, 2022

(51) Int. Cl.
G09B 5/14 (2006.01)
G06F 11/30 (2006.01)
H04N 21/2187 (2011.01)
G06F 40/20 (2020.01)

(52) U.S. Cl.
CPC ............... *G09B 5/14* (2013.01); *G06F 11/30* (2013.01); *G06F 40/20* (2020.01); *H04N 21/2187* (2013.01)

(58) Field of Classification Search
CPC .......... G09B 5/14; G06F 40/20; G06F 11/30; H04N 21/2187
See application file for complete search history.

(56) References Cited

U.S. PATENT DOCUMENTS

| | | | | |
|---|---|---|---|---|
| 8,794,979 B2* | 8/2014 | Beavers | ........... | G09B 5/14 434/350 |
| 9,520,069 B2* | 12/2016 | Wood | ........... | G09B 7/00 |
| 9,846,972 B2* | 12/2017 | Montgomerie | ........... | G09B 5/06 |
| 10,482,882 B2 | 11/2019 | Vuskovic et al. | | |
| 10,693,823 B2 | 6/2020 | Bostick et al. | | |
| 10,783,476 B2* | 9/2020 | Allen | ........... | G09B 5/125 |
| 11,285,384 B2* | 3/2022 | Fung | ........... | A63F 13/26 |
| 11,436,938 B2* | 9/2022 | Mallin | ........... | G06Q 50/20 |
| 2009/0186328 A1* | 7/2009 | Robinson | ........... | G09B 5/14 434/350 |
| 2009/0226872 A1* | 9/2009 | Gunther | ........... | G09B 7/00 434/350 |
| 2016/0133148 A1 | 5/2016 | Hanks et al. | | |
| 2017/0154339 A1* | 6/2017 | Kimberlin | ........... | B64F 5/40 |
| 2018/0122254 A1* | 5/2018 | Rangan | ........... | H04N 7/142 |

(Continued)

OTHER PUBLICATIONS

US 8,819,063, 08/2014, Next IT Corporation (withdrawn)

(Continued)

*Primary Examiner* — Xuan M Thai
*Assistant Examiner* — Sadaruz Zaman
(74) *Attorney, Agent, or Firm* — Baker, Donelson, Bearman, Caldwell & Berkowitz, PC (57) ABSTRACT

A system and method for providing private message monitoring in a virtual class session monitors student private messages using natural language processing. The system is configured to communicatively couple a teacher computer, one or more student computers, and a web server over the Internet. The web server captures a private message between a first student computer and a second student computer, extract message text from the private message, process the extracted message text using natural language processing to identify a message topic, and when the message topic is not a current topic in a virtual class session, transmit a message to the first student computer and the second student computer to stay on topic of the virtual class session.

6 Claims, 5 Drawing Sheets

(56) References Cited

U.S. PATENT DOCUMENTS

| | | | |
|---|---|---|---|
| 2018/0124477 A1* | 5/2018 | Qu | H04N 21/8545 |
| 2018/0131645 A1 | 5/2018 | Magliozzi et al. | |
| 2019/0274612 A1* | 9/2019 | Chavez, Jr. | G09B 5/14 |
| 2020/0068243 A1* | 2/2020 | Hardee | H04N 21/8405 |
| 2020/0074011 A1* | 3/2020 | Jaiswal | G06N 20/00 |
| 2020/0154166 A1* | 5/2020 | Rakshit | H04N 21/2187 |
| 2020/0242953 A1* | 7/2020 | Chen | G09B 5/06 |
| 2020/0302817 A1* | 9/2020 | Williams | G09B 5/10 |
| 2020/0379575 A1* | 12/2020 | Banerjee | G06F 3/012 |
| 2020/0379836 A1* | 12/2020 | Vaughn | G06K 9/6262 |
| 2021/0034876 A1* | 2/2021 | Rodriguez Bravo | G06V 20/41 |
| 2021/0056750 A1* | 2/2021 | Rowley | G06T 19/20 |
| 2021/0120049 A1* | 4/2021 | Sodagar | H04L 65/1069 |
| 2021/0124797 A1* | 4/2021 | Rubin | G06F 17/18 |
| 2021/0150924 A1* | 5/2021 | Yang | G10L 15/26 |

OTHER PUBLICATIONS https://syncedreview.com/2018/12/15/natural-language-processing-in-early-education/ Ying Shan, Natural Language Processing In Early Education, Synced, Dec. 15, 2018.

* cited by examiner

STUDENT MESSAGE MONITORING USING NATURAL LANGUAGE PROCESSING

TECHNICAL FIELD

This application relates in general to a system and method for providing virtual student monitoring, and more specifically, to a system and method for providing private message monitoring in a virtual teaching environment using natural language processing.

BACKGROUND

As a result of the COVID-19 pandemic, there has been a surge in online classroom demand. To regulate and monitor student's activity and maintain class productivity in the online classroom, teachers would normally need to ask questions and monitor chats. However, most of the online class platforms allow students to send each other private messages which may not be available to the teachers. Students, especially younger ones, tend to become unfocused and talk to their friends about things that aren't pertinent to the class. Teachers need to constantly look at the private message logs, if they are available, resulting in an unfocused lesson and an overall reduction in the quality of lessons.

Therefore, a need exists for a system and method for providing private message monitoring in a virtual teaching environment using natural language processing. The present invention attempts to address the limitations and deficiencies in current remote teaching systems according to the principles and example embodiments disclosed herein.

SUMMARY

In accordance with the present invention, the above and other problems are solved by providing a system and method for providing private message monitoring in a virtual teaching environment using natural language processing according to the principles and example embodiments disclosed herein.

In one embodiment, the present invention is system for providing private message monitoring in a virtual class session monitors student private messages using natural language processing. The system is configured to communicatively couple a teacher computer, one or more student computers, and a web server over the Internet. The web server captures a private message between a first student computer and a second student computer, extract message text from the private message, process the extracted message text using natural language processing to identify a message topic, and when the message topic is not a current topic in a virtual class session, transmit a message to the first student computer and the second student computer to stay on topic of the virtual class session.

In another aspect of the present invention, the web server provides notice to the teacher computer of the off-topic message between the first student computer and the second student computer, and when an observed number of off-topic messages between the first student computer and the second student computer exceeds a predefined value, transmit a warning message to the first student computer and the second student computer to stay after the virtual class session ends to discuss the off-topic messages.

In another aspect of the present invention, the virtual class session provides live streaming video and streaming audio between the teacher computer and the one or more student computers.

In another aspect of the present invention, the web server further transmits a behavior message to the first student computer to stay after the virtual class session ends to discuss the off-topic messages when an observed number of off-topic messages between the first student computer other student computers exceeds a predefined value.

In another aspect of the present invention, when the off-topic messages are between the first student computer, the second computer, and one or more other student computers, all of the student computers who are a sender or a recipient of the off-topic message are included in the student computers receiving a behavior message to stay after the virtual class session.

In another embodiment, a method provides private message monitoring in a virtual teaching environment having a computing system to communicate between the student using natural language processing. The system is configured to communicatively couple a teacher computer, one or more student computers, and a web server over the Internet. The method captures a private message between a first student computer and a second student computer, extracts message text from the private message, processes the extracted message text using natural language processing to identify a message topic, and when the message topic is not a current topic in a virtual class session, transmits a warning message to the first student computer and the second student computer to stay on topic of the virtual class session.

In another embodiment of the present disclosure, the method further provides notice to the teacher computer of the off-topic message between the first student computer and the second student computer, and when an observed number of off-topic messages between the first student computer and the second student computer exceeds a predefined value, transmits a message to the first student computer and the second student computer to stay after the virtual class session ends to discuss the off-topic messages.

In another aspect of the present disclosure, the method further transmits a behavior message to the first student computer to stay after the virtual class session ends to discuss the off-topic messages when an observed number of off-topic messages between the first student computer other student computers exceeds a predefined value.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only, and is not intended as a definition of the limits of the present invention.

BRIEF DESCRIPTION OF THE DRAWINGS

Referring now to the drawings in which like reference numbers represent corresponding parts throughout.

DETAILED DESCRIPTION

This application relates in general to a system and method for providing virtual student monitoring, and more specifically, to a system and method for providing private message monitoring in a virtual teaching environment using natural language processing according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly."

The term "mobile application" refers to an application executing on a mobile device such as a smartphone, tablet, and/or web browser on any computing device.

The terms "individual", "student", "teacher", and "user" refer to an entity, e.g. a human, using a private messaging system including any software or smart device application(s) associated with the invention. The term user herein refers to one or more users.

The term "connection" refers to connecting any component as defined below by any means, including but not limited to, a wired connection(s) using any type of wire or cable for example, including but not limited to, coaxial cable(s), fiberoptic cable(s), or ethernet cable(s) or wireless connection(s) using any type of frequency/frequencies or radio wave(s). Some examples are included below in this application.

The term "invention" or "present invention" refers to the invention being applied for via the patent application with the title "Student Message Monitoring Using Natural Language Processing." Invention may be used interchangeably with monitor.

The terms "communicate," or "communication" refer to any component(s) connecting with any other component(s) in any combination for the purpose of the connected components to communicate and/or transfer data to and from any components and/or control any settings.

Figure 1:
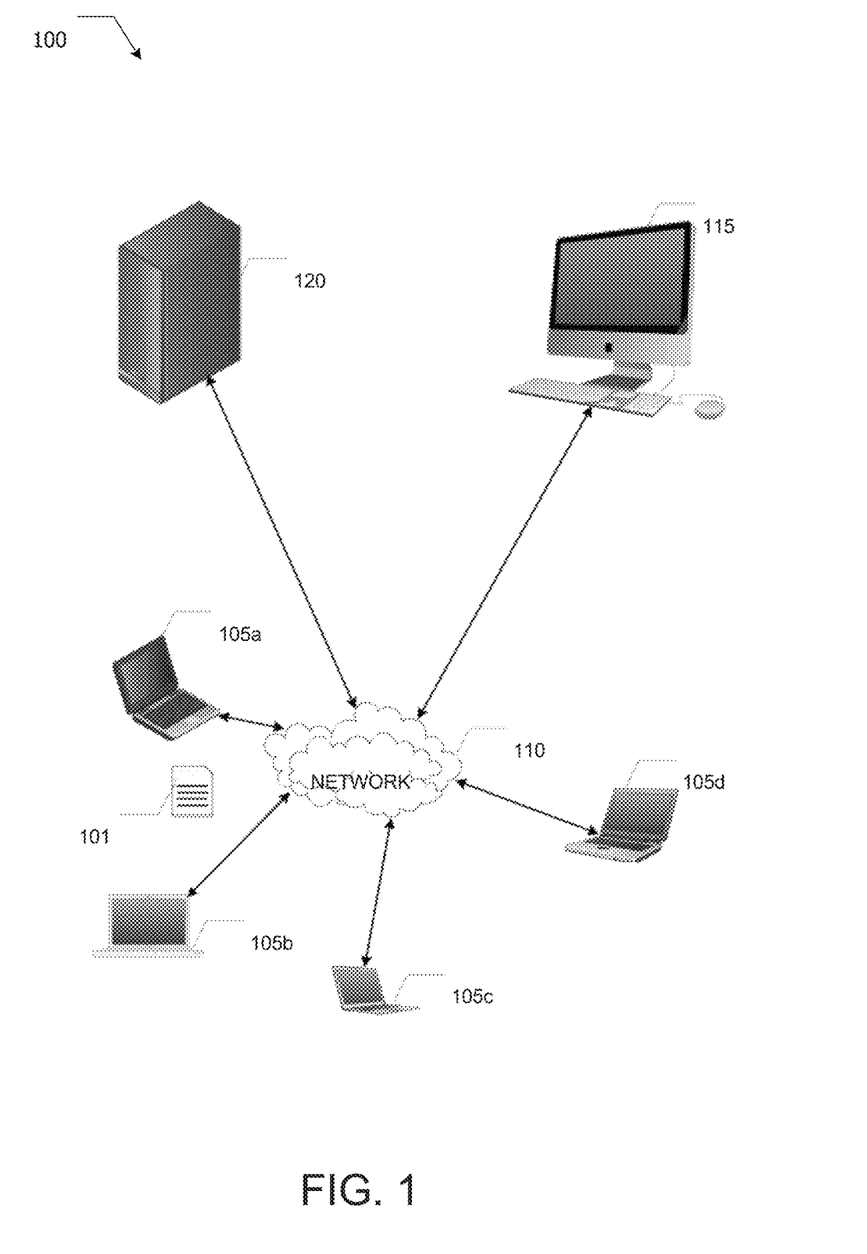
FIG. 1 illustrates a system for providing private message monitoring in a virtual teaching environment using natural language processing according to the present invention.

In general, the present disclosure relates to a system and method for providing private message monitoring in a virtual teaching environment using natural language processing. To better understand the present invention, FIG. 1 illustrates a system for providing private message monitoring in a virtual teaching environment using natural language processing according to the present invention. Most remote teaching systems 100 communicatively connect a plurality of student computing devices 105*a-d*, a teacher computing system 115 and a classroom communications server 120 over the Internet 110 or a similar public or private wide area network.

Educational software programs on the teacher computing system 115 and the plurality of student computing systems 105*a-d* may communicate with each other to provide real-time video and audio communications that permit the students and teachers to interact as if they were in a virtual classroom. The students' computing system 105*a-d* and the teachers' computing system 115 include a microphone, speaker, and video camera to capture and share the actions and comments of each other interactively. Using the classroom communications server 120, the teacher may obtain stored content that may be shared with all of the users' computing systems. The classroom communications server 120 provides a communication mechanism for the students and teachers to join and leave the virtual classroom.

In order to facilitate learning and sharing of ideas, the educational software programs on the teachers' computing system 115 and the plurality of student computing systems 105*a-d* typically permit these users to exchange private messages 101 between two or more users that allow individuals to share information without interrupting the activities of others in the virtual classroom. These private messages 101 typically are text-based messages that are sent to one or more of the other users in the virtual classroom. These private messages are intended to be used for students to share ideas and thoughts about the lessons that enhance the educational process. These private messages also permit the students to work in smaller groups on a topic that is part of a teacher's class plan for a particular class session.

Students may not always utilize this messaging tool to send appropriate, on-topic text messages 101 to each other thereby distracting from the learning exercises and activities underway in the virtual classroom. As the classroom communications server 120 provides the communication channel between all users for these messages, a passive message monitoring module may check these messages to see whether or not the students are staying on topic.

Through the use of a natural language processing algorithm, teachers will be able to automatically monitor private messages during the online classes and remind students to stay on task and focus on the lesson. This automation serves a dual purpose: it preserves student privacy while also making it easier for teachers to regulate the class and keep the students engaged.

The teacher can use multiple presets for the natural language processing algorithm which help filter and detect messages that do not align with the preset the teacher has selected. Teachers also are able to make custom filters that are specific to the class topic. These presets and filters may be configured for each of the teachers' different classes to permit teachers to tailor the amount and nature of the message monitoring that is needed for any particular class.

Teachers also can request the algorithm to log the number of times the algorithm has messaged a student to stay on topic and generate a report after the class is over. The system 100 may provide real time messages to both the students and the teachers regarding the detection of off topic messages, detection of messages containing safety-related concerns, and the detection of other types of messages that are of interest and concern to the teacher. These message filters and off-topic counting also may be tailored to an individual student's needs or groups of students who may have special needs that differ from the student population at large. All of these parameters and filter configurations may be set up when a term of a school begins and used every time a particular virtual class meets. Of course, the teacher may wish to alter these configuration settings should circumstances and situations change over time.

In NLP, paragraphs are generally segmented into sentences. The processing assumes that each sentence is its own idea. The sentence is split into words; this process is referred to as tokenization. The parts of speech are identified for each token. Then by identifying each word, and the different forms of words, a process may produce an interpretation for the language being processed that extracts much of information from a paragraph.

The present invention as disclosed herein is contained within a virtual learning system whether is Zoom™ Blackboard™, or others. Outside communications using cell phone or others apps are an issues for parents rather than teachers as it is difficult for teachers to manage cell phone usages in a virtual learning environment.

The invention may use any type of network such as a single network, multiple networks of a same type, or multiple networks of different types which may include one or more of a direct connection between devices, including but not limited to a local area network (LAN), a wide area network (WAN) (for example, the Internet), a metropolitan area network (MAN), a wireless network (for example, a general packet radio service (GPRS) network), a long term evolution (LTE) network, a telephone network (for example, a Public Switched Telephone Network or a cellular network), a subset of the Internet, an ad hoc network, a fiber optic network (for example, a fiber optic service (often known as FiOS) network), or any combination of the above networks.

Smart devices mentioned herein the present application also may use one or more sensors to receive or send signals, such as wireless signals, for example, over Bluetooth™ wireless fidelity, infrared, Wi-Fi, or LTE. Any smart device mentioned in this application may be connected to any other component or smart device via wired communications (e.g., conductive wire, coaxial cable, fiber optic cable, ethernet cable, twisted pair cable, transmission line, waveguide, etc.), or a combination of wired and wireless communications. The invention's method and/or system may use a single server device or a collection of multiple server devices and/or computer systems.

The systems and methods described above, may be implemented in many different forms of applications, software, firmware, and hardware. The actual software or smart device application codes or specialized control software, hardware or smart device application(s) used to implement the invention's systems and methods is not limiting of the implementation. Thus, the operation and behavior of the systems and methods were described without reference to the specific software or firmware code. Software, smart device application(s), firmware, and control hardware can be designed to implement the systems and methods based on the description herein.

While all of the above functions are described to be provided to users via a mobile application on a smartphone, one of ordinary skill will recognize that any computing device including tablets, laptops, and general purpose computing devices may be used as well. In at least one embodiment, all of the services described herein are provided using web pages being accessed from the web server 201 using a web browser such as Safari™, Firefox™, Chrome™ DuckDuckGo™, and the like. All of the screen examples described herein show user interface elements that provide the functionality of the present invention. The arrangement, organization, presentation, and use of particular user input/output (I/O) elements including hyperlinks, buttons, text fields, scrolling lists, and similar I/O elements are shown herein for example embodiments only to more easily convey the features of the present invention. The scope of the present invention should not be interpreted as being limited by any of these elements unless expressly recited within the attached claims.

For the purposes of the example embodiment in FIG. 1, various functions are shown to be performed on different programmable computing devices that communicate with each other over the Internet 105. These computing devices may include smartphones 101a, laptop computers 101b, tablets (not shown), and similar devices so long as the disclosed functionality of the mobile application described herein is supported by the particular computing device. One of ordinary skill will recognize that this functionality is grouped as shown in the embodiment for clarity of description. Two or more of the processing functions may be combined onto a single processing machine. Additionally, it may be possible to move a subset of processing from one of the processing systems shown here and retain the functionality of the present invention. The attached claims recite any required combination of functionality onto a single machine, if required, and all example embodiments are for descriptive purposes.

For all of the above devices that are in communication with each other, some or all of them need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects, and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method or algorithm is carried out or executed. Some steps may be omitted in some aspect or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example, an end-user computer system, a client computer, a network server or other server system, a mobile computing device (e.g., tablet computing device, mobile phone, smartphone, laptop or other appropriate computing device), a consumer electronic device, a music player or any other suitable electronic device, router, switch or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines or other appropriate virtual environments).

Figure 2A:
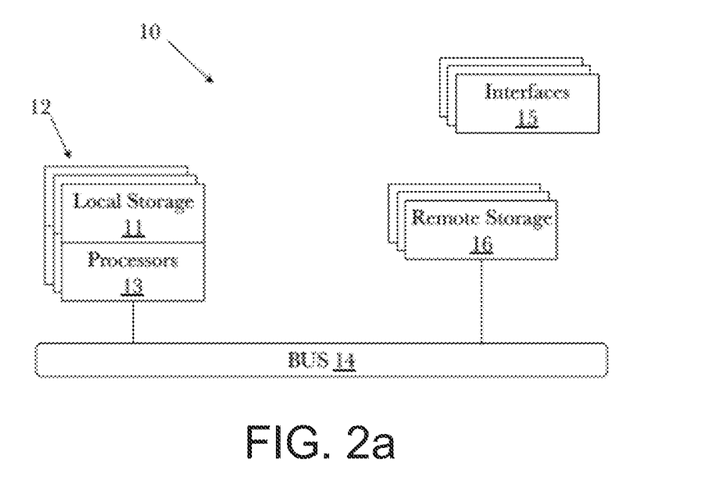
FIG. 2a is a block diagram illustrating an exemplary hardware architecture of a computing device.

Referring now to FIG. 2a, there is a block diagram depicting an exemplary computing device 10 suitable for implementing at least a portion of the features or functionalities disclosed herein. The computing device 10 may be, for example, any one of the computing machines listed in the previous paragraph, or indeed any other electronic device capable of executing software- or hardware-based instructions according to one or more programs stored in memory. The computing device 10 may be configured to communicate with a plurality of other computing devices, such as clients or servers, over communications networks such as a wide area network, a metropolitan area network, a local area network, a wireless network, the Internet or any other network, using known protocols for such communication, whether wireless or wired.

In one aspect, the computing device 10 includes one or more central processing units (CPU) 12, one or more interfaces 15, and one or more buses 14 (such as a peripheral component interconnect (PCI) bus). When acting under the control of appropriate software or firmware, a CPU 12 may be responsible for implementing specific functions associated with the functions of a specifically-configured computing device or machine. For example, in at least one aspect, a computing device 10 may be configured or designed to function as a server system utilizing a CPU 12, local memory 11 and/or remote memory 16, and interface(s) 15. In at least one aspect, a CPU 12 may be caused to perform one or more of the different types of functions and/or operations under the control of software modules or components, which for example, may include an operating system and any appropriate applications software, drivers, and the like.

A CPU 12 may include one or more processors 13 such as for example, a processor from one of the Intel, ARM, Qualcomm, and AMD families of microprocessors. In some aspect, processors 13 may include specially designed hardware such as application-specific integrated circuits (ASICs), electrically erasable programmable read-only memories (EEPROMs), field-programmable gate arrays (FPGAs), and so forth, for controlling operations of a computing device 10. In a particular aspect, a local memory 11 (such as non-volatile random access memory (RAM) and/or read-only memory (ROM), including for example, one or more levels of cached memory) may also form part of a CPU 12. However, there are many different ways in which memory may be coupled to a system 10. Memory 11 may be used for a variety of purposes such as, for example, caching and/or storing data, programming instructions, and the like. It should be further appreciated that a CPU 12 may be one of a variety of system-on-a-chip-(SOC)-type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may, for example, support other peripherals used with a computing device 10. Among the interfaces that may be provided are ethernet interfaces, frame relay interfaces, cable interfaces, DSL interfaces, token ring interfaces, graphics interfaces, and the like. In addition, various types of interfaces may be provided such as, for example, universal serial bus (USB), serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast ethernet interfaces, gigabit ethernet interfaces, serial ATA (SATA) or external SATA (ESATA) interfaces, high-definition multimedia interfaces (HDMI), digital visual interfaces (DVI), analog or digital audio interfaces, asynchronous transfer mode (ATM) interfaces, high-speed serial interfaces (HSSI), point of sale (POS) interfaces, fiber data distributed interfaces (FDDIs), and the like. Generally, such interfaces 15 may include physical ports appropriate for communication with appropriate media. In some cases, they also may include an independent processor (such as a dedicated audio or video processor, as is common in the art for high-fidelity A/V hardware interfaces) and, in some instances, volatile and/or non-volatile memory (e.g., RAM).

Although the system shown in FIG. 2a illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and a server system (such as a server system described in more detail below).

Regardless of network device configuration, the system of an aspect may employ one or more memories or memory modules (for example, remote memory block 16 and local memory 11) configured to store data, program instructions for the general-purpose network operations or other information relating to the functionality of the aspects described herein (or any combinations of the above). Program instructions may control execution of or comprise an operating system and/or one or more applications, for example. Memory 16 or memories 11, 16 also may be configured to store data structures, configuration data, encryption data, historical system operations information or any other specific or generic non-program information described herein.

Because such information and program instructions may be employed to implement one or more systems or methods described herein, at least some network device aspects may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device) or they may be removable such as swappable flash memory modules (such as "thumb drives" or other removable media designed for rapidly exchanging physical storage devices), "hot-swappable" hard disk drives or solid state drives, removable optical storage disks, or other such removable media, and that such integral and removable storage media may be utilized interchangeably. Examples of program instructions include both object code, such as may be produced by a compiler, machine code, such as may be produced by an assembler or a linker, byte code, such as may be generated by for example by a JAVA™ compiler and may be executed using a JAVA™ virtual machine or equivalent, or files containing higher level code that may be executed by the computer using an interpreter (for example, scripts written in Python™, Perl™, Ruby™, Groovy™, or any other scripting language).

Figure 2B:
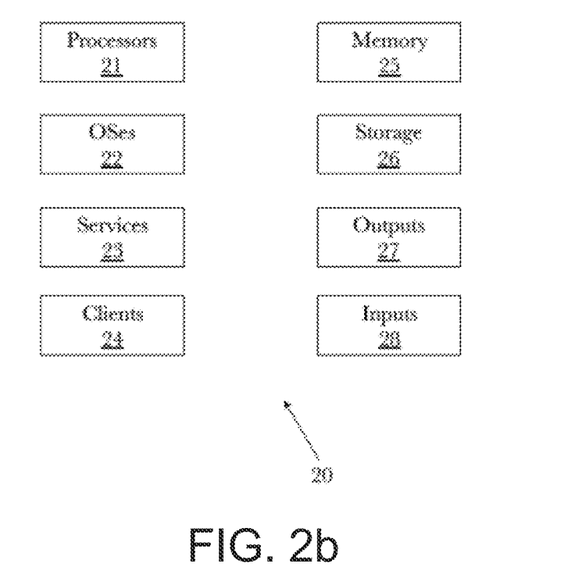
FIG. 2b is a block diagram illustrating an exemplary logical architecture for a client device.

In some aspects, systems may be implemented on a standalone computing system. Referring now to FIG. 2b, there is a block diagram depicting a typical exemplary architecture of one or more aspects or components thereof on a standalone computing system. A computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the LINUX™ operating system, ANDROID™ operating system, or the like. In many cases, one or more shared services 23 may be operable in system 20, and may be useful for providing common services to client applications 24. Services 23 may, for example, be WINDOWS™ services, user-space common services in a LINUX™ environment or any other type of common service architecture used with an operating system 22. Input devices 28 may be of any type suitable for receiving user input including, for example, a keyboard, touchscreen, microphone (for example, for voice input), mouse, touchpad, trackball or any combination thereof. Output devices 27 may be of any type suitable for providing output to one or more users, whether remote or local to system 20, and may include, for example, one or more screens for visual output, speakers, printers or any combination thereof. Memory 25 may be RAM having any structure and architecture known in the art for use by processors 21, for example to run software. Storage devices 26 may be any magnetic, optical, mechanical, memristor or electrical storage device for storage of data in digital form (such as those described above, referring to FIG. 2*a*). Examples of storage devices 26 include flash memory, magnetic hard drive, CD-ROM, and the like.

Figure 2C:
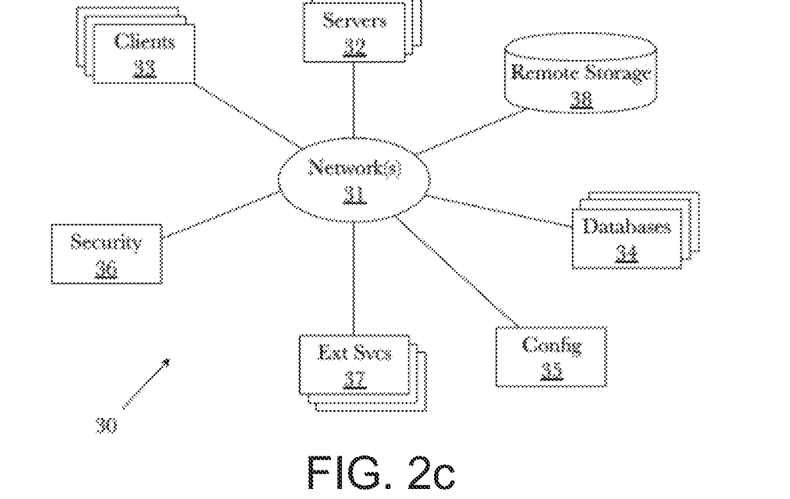
FIG. 2c is a block diagram showing an exemplary architectural arrangement of clients, servers, and external services.

In some aspects, systems may be implemented on a distributed computing network, such as one having any number of clients and/or servers. Referring now to FIG. 2*c*, there is a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 2*b*. In addition, any number of servers 32 may be provided for handling requests received from one or more clients 33. Clients 33 and servers 32 may communicate with one another via one or more electronic networks 31, which may be in various aspects any Internet, wide area network, mobile telephony network (such as CDMA or GSM cellular networks), wireless network (such as WiFi, WiMAX, LTE, and so forth) or local area network (or indeed any network topology known in the art; the aspect does not prefer any one network topology over another). Networks 31 may be implemented using any known network protocols, including, for example, wired and/or wireless protocols.

In addition, in some aspects, servers 32 may call external services 37 when needed to obtain additional information or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored on a server system 32 in the Cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and use a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web system. It should be understood by one having ordinary skill in the art that any configuration or security subsystems known in the art now or in the future may be used in conjunction with aspects without limitation, unless a specific security 36 or configuration system 35 or approach is required by the description of any specific aspect.

Figure 2D:
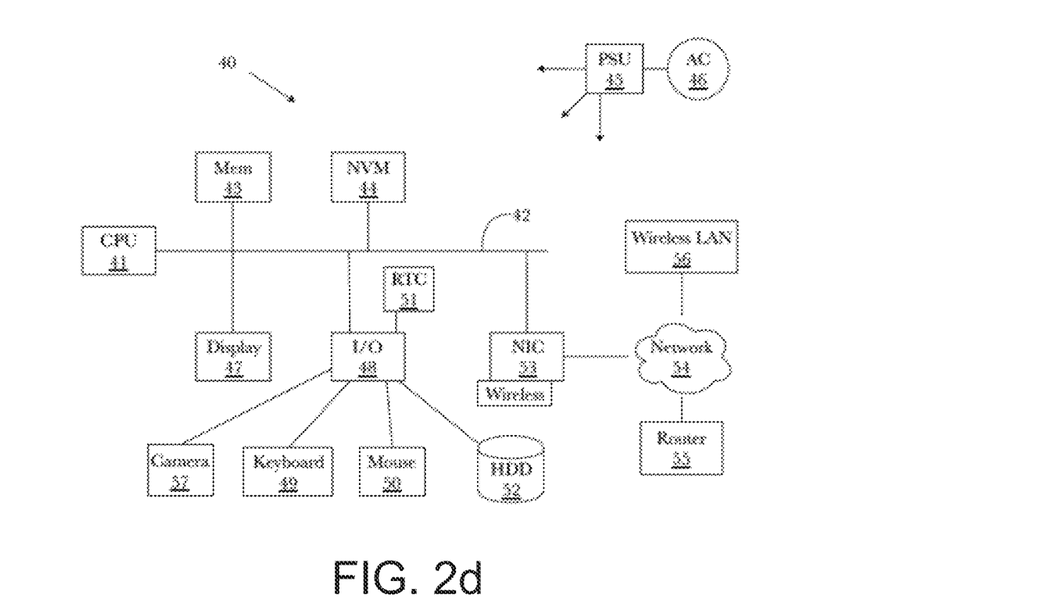
FIG. 2d is another block diagram illustrating an exemplary hardware architecture of a computing device.

FIG. 2*d* shows an exemplary overview of a computer system 40 as may be used in any of the various locations throughout the system. It is exemplary of any computer that may execute code to process data. Various modifications and changes may be made to a computer system 40 without departing from the broader scope of the system and method disclosed herein. A CPU 41 is connected to a bus 42, to which bus is also connected to memory 43, non-volatile memory 44, display 47, I/O unit 48, and network interface card (NIC) 53. An I/O unit 48 may, typically, be connected to peripherals such as a keyboard 49, pointing device 50, hard disk 52, real-time clock 51, camera 57, and other peripheral devices. A NIC 53 connects to a network 54, which may be the Internet or a local network, which local network may or may not have connections to the Internet. The system may be connected to other computing devices through the network via a router 55, wireless local area network 56 or any other network connection. Also shown as part of a system 40 is a power supply unit 45 connected, in this example, to a main alternating current (AC) supply 46. Not shown are batteries that could be present and many other devices and modifications that are well known, but are not applicable to, the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles or other integrated hardware devices).

In various aspects, functionality for implementing systems or methods of various aspects may be distributed among any number of client and/or server components. For example, various software modules may be implemented for performing various functions in connection with the system of any particular aspect, and such modules may be implemented to run on server and/or client components.

Figure 3:
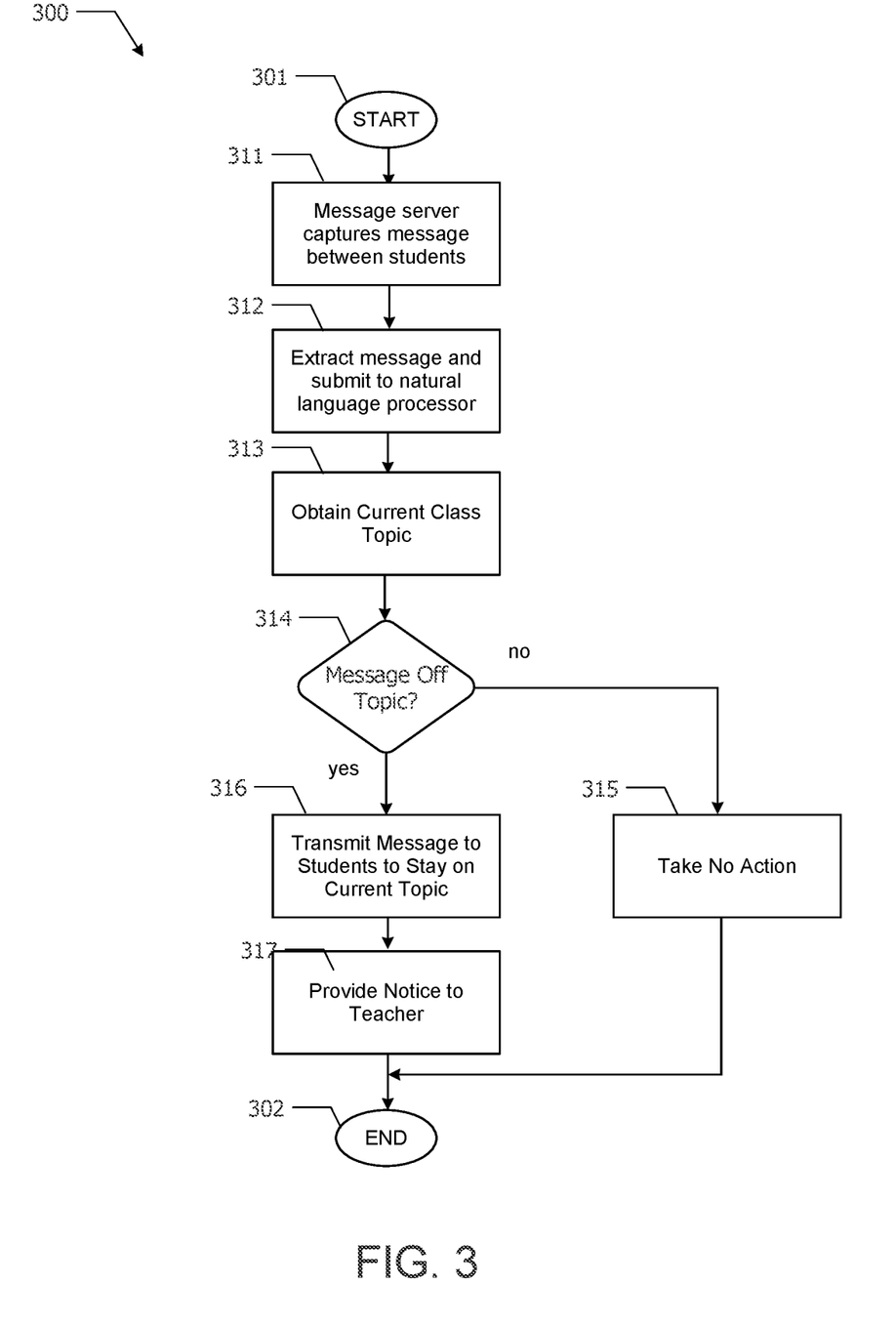
FIG. 3 illustrates an example embodiment of a method and algorithm for providing private message monitoring in a virtual teaching environment using natural language processing according to the present invention.

FIG. 3 illustrates an example embodiment of a method and algorithm for providing private message monitoring in a virtual teaching environment using natural language processing according to the present invention. In the first embodiment of the method and algorithm of the present invention, the process 300 starts 301 and the classroom communications server 120 captures private messages as they are being sent between students in step 311. The classroom communications server 120 extracts, in step 312, contents of the message between the students for processing using natural language processing. The classroom communications server 120 searches for keywords and phrases that are related to the topic of the classroom session as well as keywords and phrases that are known to be off-topic subjects. The classroom communications server 120 obtains information about the current classroom topic in step 313. As noted above, the topic of a class may include keywords and phrases that are common to all of the classroom sessions of a particular class. These keywords and phrases also may be specified for just a single lesson or class session that a teacher configures and modifies for a given class session.

Using the keywords and phrases extracted from the message, and using the specified topic description and terms provided by the teacher, the classroom communications server 120 in test step 314 determines whether or not the particular message being processed is on topic, and if so, no action is taken in step 315 and the message continues to the recipients. When text step 314 determines that the message is off topic, the classroom communications server 120 sends an automated message to the students involved in the private message to stay on topic of the classroom session. The process 300 may also provide real time notice to the teacher of the identity and content of the off topic messages in step 317 and the process ends 302. As noted above, the process 300 also may identify off-topic messages that indicate a potential or actual threat of damage and harm to the class and to other students that may require special attention. The process 300 may include keywords and phrases that are included in these sensitive topics that require specific responses. The private message 101 may continue to its destination if so specified in the configuration of the classroom communications server 120.

Figure 4:
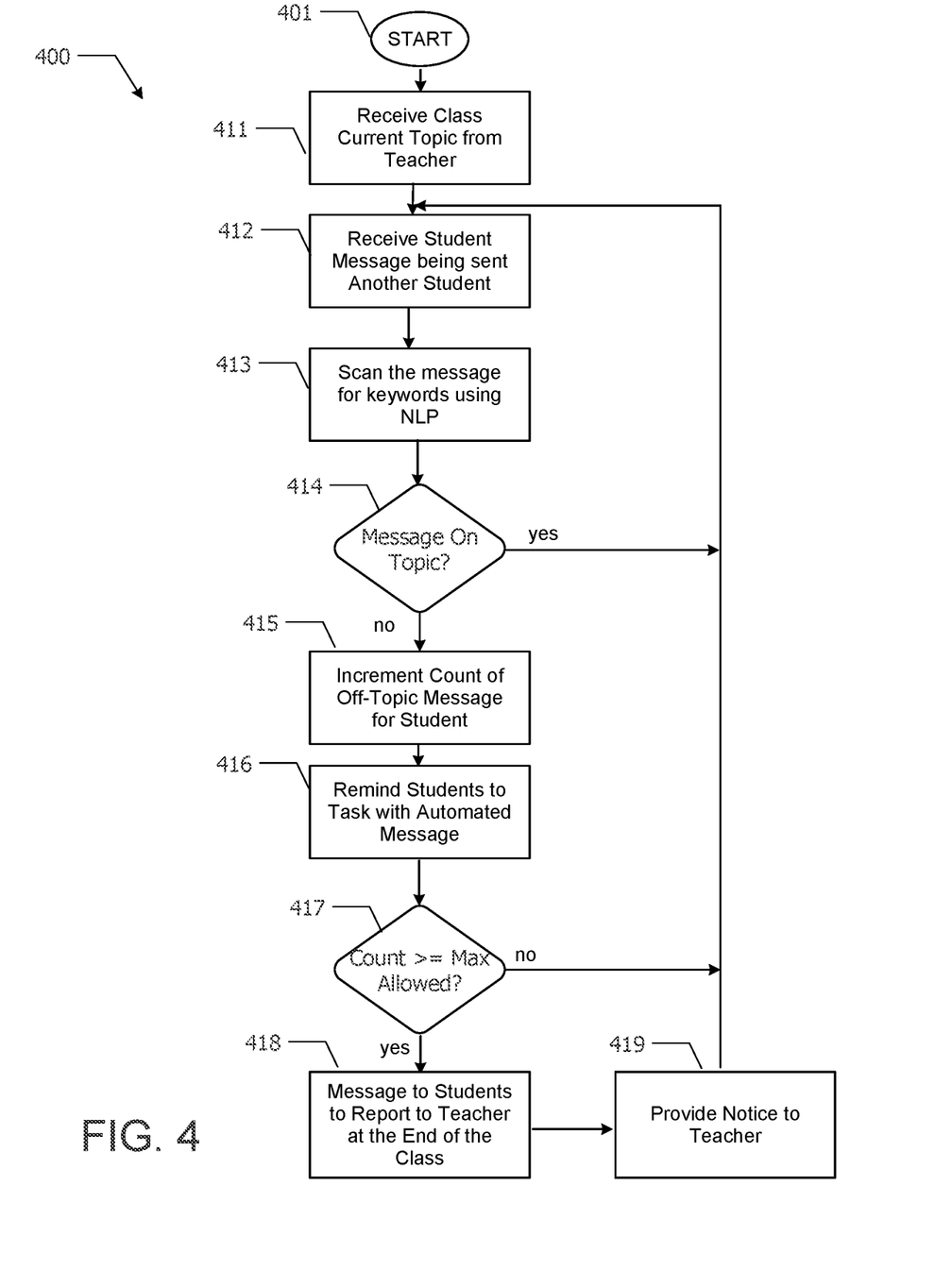
FIG. 4 illustrates an example embodiment of a method and algorithm for providing private message monitoring in a virtual teaching environment using natural language processing according to the present invention.

FIG. 4 illustrates an example embodiment of a method and algorithm for providing private message monitoring in a virtual teaching environment using natural language processing according to the present invention. The process 400 begins 401 with the classroom communications server 120 receiving data associated with a current topic for a class session in step 411. The classroom communications server 120 also may reset any parameters and count data to an initial value for a particular class session.

The process 400 continues to step 412 in which the classroom communications server 120 obtains a private message 101 between students during a class session. Step 413 permits the classroom communications server 120 to scan the content of the private message 101 to extract keywords and phrases related to its content. The classroom communications server 120, in test step 414, determines whether or not the content of the private message is on topic, and if it is, the process returns to step 412 to obtain the next private message and the current private message is delivered to its recipients.

When test step 414 causes the classroom communications server 120 to determine that a particular private message 101 is off topic, a count of off-topic messages associated with the participants in the private message is incremented in step 415. In a preferred embodiment, each student may possess an individual count value that is independent of all of the other students. In other embodiments, the count may be associated with the group of students who are part of the private message as either a sender or recipient rather than individuals.

The classroom communications server 120, in step 416, automatically sends a reminder message to the participants in the private message that they need to stay on topic of the current class session as the private message 101 is delivered. If desired, the process 400 may also provide notice of the off-topic message to the teacher's computing system 115 in real time so the teacher may take additional steps if desired.

The classroom communications server 120 determines whether or not a count of off-topic messages for each of the individuals participating in the private message 101 being processed in test step 417 is greater than or equal to a maximum allowed number of off-topic messages. If the classroom communications server 120 determines the current count for an individual party to the private message 101 is below the maximum allowed count no further action is taken with respect to this individual and the process 400 may return to step 412 to await the arrival of the next private message 101. The comparison of the incremented count value with the maximum allowed value, as well as the incrementing of the count, may be performed separately for each of the participants to the private message 110.

When the classroom communications server 120 determines in test step 417 a student(s) has exceeded the maximum allowed off-topic messages, a message is sent to the one or more students who have a count exceeding the maximum to report to the teacher at the end of the class session in step 418. The teacher is provided notice in step 419 that the named students are now scheduled to report to the teacher when the class ends. Once complete, the process 400 returns to step 412 to await and process the next private message 101. The above process 400 continues until the class session ends.

The embodiments described herein are implemented as logical operations performed by a computer. The logical operations of these various embodiments of the present invention are implemented (1) as a sequence of computer-implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Even though particular combinations of features are recited in the present application, these combinations are not intended to limit the disclosure of the invention. In fact, many of these features may be combined in ways not specifically recited in this application. In other words, any of the features mentioned in this application may be included to this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise. Any singular term used in this present patent application is applicable to its plural form even if the singular form of any term is used.

In the present application, all or any part of the invention's software or application(s) or smart device application(s) may be installed on any of the user's or operator's smart device(s), any server(s) or computer system(s) or web application(s) required to allow communications or transfer of content(s) or data between any combination of the components.

What is claimed is:

1. A system for providing private message monitoring in a virtual class session using natural language processing, the system configured to communicatively couple a teacher computer, one or more student computers, and a web server over the Internet, the web server comprising:
    a memory having instructions stored thereon; and
    a processor configured to execute the instructions on the memory to cause the web server to:
        capture a private message between a first student computer and a second student computer;
        extract message text from the private message;
        process the extracted message text using natural language processing to identify a message topic;
        when the message topic is not a current topic in a virtual class session, transmit a message to the first student computer and the second student computer to stay on topic of the virtual class session;
        provide notice to the teacher computer of the off-topic message between the first student computer and the second student computer; and
        when an observed number of off-topic messages between the first student computer and the second student computer exceeds a predefined value, transmit a warning message to the first student computer and the second student computer to stay after the virtual class session ends to discuss the off-topic messages.

2. The system according to claim 1, wherein the virtual class session provides live streaming video and streaming audio between the teacher computer and the one or more student computers.

3. The system according to claim 2, wherein when the off-topic messages are between the first student computer, the second computer, and one or more other student computers, all of the student computers who are a sender or a recipient of the off-topic message are included in the student computers receiving a behavior message to stay after the virtual class session.

4. A method for providing private message monitoring in a virtual teaching environment using natural language processing, the system configured to communicatively couple a teacher computer, one or more student computers, and a web server over the Internet, the method comprising:
    capturing a private message between a first student computer and a second student computer;
    extracting message text from the private message;
    processing the extracted message text using natural language processing to identify a message topic;
    when the message topic is not a current topic in a virtual class session, transmitting a warning message to the first student computer and the second student computer to stay on topic of the virtual class session;
    providing notice to the teacher computer of the off-topic message between the first student computer and the second student computer; and
    when an observed number of off-topic messages between the first student computer and the second student computer exceeds a predefined value, transmits a message to the first student computer and the second student computer to stay after the virtual class session ends to discuss the off-topic messages.

5. The method according to claim 4, wherein the method further:
    when an observed number of off-topic messages between the first student computer other student computers exceeds a predefined value, transmit a behavior message to the first student computer to stay after the virtual class session ends to discuss the off-topic messages.

6. The method according to claim 4, wherein the virtual class session provides live streaming video and streaming audio between the teacher computer and the one or more student computers.

* * * * *